US008147979B2

(12) United States Patent
Khabbaz et al.

(10) Patent No.: US 8,147,979 B2
(45) Date of Patent: Apr. 3, 2012

(54) ADHESIVE SYSTEM AND METHOD

(75) Inventors: Farideh Khabbaz, Bromma (SE);
Anders Per Eriksson, Nacka (SE);
Joanna Fare, Huddinge (SE); Anna Kristina Furberg, Sundbyberg (SE)

(73) Assignee: AKZO Nobel Coatings International B.V., Arnhem (NL)

( * ) Notice: Subject to any disclaimer, the term of this patent is extended or adjusted under 35 U.S.C. 154(b) by 0 days.

(21) Appl. No.: 11/473,963

(22) Filed: Jun. 23, 2006

(65) Prior Publication Data

US 2007/0004828 A1 Jan. 4, 2007

Related U.S. Application Data

(60) Provisional application No. 60/695,445, filed on Jul. 1, 2005.

(51) Int. Cl.
*B32B 5/66* (2006.01)
(52) U.S. Cl. .................. 428/532; 428/533; 428/355 R; 428/355 CP; 424/402; 156/326
(58) Field of Classification Search .................. 428/532, 428/533, 355 R, 355 CP; 424/402; 156/326
See application file for complete search history.

(56) References Cited

U.S. PATENT DOCUMENTS

| | | | |
|---|---|---|---|
| 2,051,025 A | 8/1936 | Bauer ........................... 154/33 |
| 2,102,937 A | 12/1937 | Bauer ........................... 134/23.4 |
| 2,250,681 A | 7/1941 | Schwartz ....................... 260/9 |
| 2,282,364 A | 5/1942 | Kunze et al. ................. 106/210 |
| 3,345,148 A | 10/1967 | Winkler et al. |
| 3,355,307 A | 11/1967 | Schoenberger et al. ...... 106/213 |
| 3,361,585 A | 1/1968 | Armour et al. |
| 3,487,033 A | 12/1969 | McElmury et al. .......... 260/17.3 |
| 3,941,728 A | 3/1976 | Solenberger |
| 3,944,428 A | 3/1976 | Schoenberg et al. ........ 106/213 |
| 4,018,959 A | 4/1977 | Demko et al. |
| 4,183,997 A | 1/1980 | Stofko ......................... 428/326 |
| 4,350,788 A * | 9/1982 | Shimokawa et al. ........ 524/309 |
| 4,687,809 A | 8/1987 | Kamikaseda et al. ........ 525/57 |
| 4,910,048 A | 3/1990 | Sinclair ...................... 427/208.6 |
| 5,000,783 A | 3/1991 | Dingeman et al. |
| 5,112,391 A | 5/1992 | Owen et al. |
| 5,185,212 A | 2/1993 | Spada et al. |
| 5,190,996 A | 3/1993 | Foran et al. .................. 524/28 |
| 5,247,066 A | 9/1993 | Schoenberg et al. ........ 528/491 |
| 5,283,277 A | 2/1994 | Kissel |
| 5,384,187 A | 1/1995 | Uemura et al. |
| 5,498,224 A | 3/1996 | Kauffman et al. |
| 5,627,261 A | 5/1997 | Albrecht et al. ............. 528/492 |
| 5,684,075 A | 11/1997 | Patel et al. |
| 5,804,618 A | 9/1998 | Mafoti et al. |
| 5,849,405 A | 12/1998 | Wang et al. |
| 5,858,554 A | 1/1999 | Neal et al. |
| 5,889,107 A | 3/1999 | Jakob et al. |
| 6,048,929 A | 4/2000 | Moffett |
| 6,207,176 B1 * | 3/2001 | Howard et al. .............. 424/402 |
| 6,255,369 B1 | 7/2001 | Philbin et al. ................ 524/47 |
| 6,440,204 B1 * | 8/2002 | Rogols et al. ............. 106/134.1 |
| 6,562,325 B2 | 5/2003 | Vitale et al. |
| 6,566,472 B1 | 5/2003 | Baumstark et al. |
| 6,706,145 B2 | 3/2004 | Werres et al. |
| 6,710,175 B2 | 3/2004 | Anderson et al. |
| 6,746,542 B1 | 6/2004 | Lorencak et al. ............ 127/32 |
| 6,753,361 B2 | 6/2004 | Kroner et al. |
| 6,803,420 B2 | 10/2004 | Cleary et al. |
| 6,956,070 B2 | 10/2005 | Fujiwara et al. |
| 7,034,068 B1 | 4/2006 | Negele et al. |
| 7,074,845 B2 | 7/2006 | Laleg |
| 7,235,608 B2 | 6/2007 | Hu et al. |
| 2002/0015823 A1 | 2/2002 | Mauler et al. |
| 2002/0096288 A1 | 7/2002 | Allen |
| 2003/0102097 A1 | 6/2003 | Moffett |
| 2003/0116294 A1 | 6/2003 | Kehrer et al. |
| 2003/0119949 A1 | 6/2003 | Favis et al. |
| 2003/0155071 A1 | 8/2003 | Werres et al. ............. 156/307.3 |
| 2004/0014844 A1 | 1/2004 | Helbling et al. |
| 2004/0018332 A1 | 1/2004 | Hu et al. ..................... 428/60 |
| 2004/0143038 A1 | 7/2004 | Aberle |
| 2004/0254285 A1 | 12/2004 | Rodrigues et al. |
| 2005/0022956 A1 | 2/2005 | Rodriguez et al. |
| 2005/0150621 A1 | 7/2005 | Neivandt et al. |
| 2005/0197441 A1 | 9/2005 | Shibutani et al. ........... 524/459 |
| 2006/0128840 A1 | 6/2006 | Graux et al. |
| 2006/0183822 A1 | 8/2006 | Nguyen-Kim et al. |
| 2007/0270608 A1 | 11/2007 | Boersma et al. |
| 2007/0298274 A1 | 12/2007 | Eriksson et al. |

(Continued)

FOREIGN PATENT DOCUMENTS

CL 1710-2006 6/2006

(Continued)

OTHER PUBLICATIONS

European Search Report for Application No. EP 05 10 6006 dated Oct. 5, 2005.

(Continued)

*Primary Examiner* — Leszek Kiliman

(74) *Attorney, Agent, or Firm* — Kenyon & Kenyon LLP

(57) ABSTRACT

The invention relates to an adhesive system comprising starch and one or more polymers (P) containing acetoacetoxy groups. It further relates to a method of producing an adhesive composition comprising starch and one or more polymers (P) containing acetoacetoxy groups. The invention further relates to a method of producing a wood based product such as a laminated or veneered material, or a particle board.

33 Claims, No Drawings

U.S. PATENT DOCUMENTS

2009/0317651 A1    12/2009    Khabbaz et al.

FOREIGN PATENT DOCUMENTS

| | | |
|---|---|---|
| CL | 1711-2006 | 6/2006 |
| CN | 1033525 | 6/1989 |
| CN | 1742055 | 3/2006 |
| DE | 43 08 089 A1 | 9/1994 |
| EP | 0 001 501 B1 | 4/1979 |
| EP | 0 229 741 B1 | 7/1987 |
| EP | 0 948 959 A2 | 10/1999 |
| EP | 0 948 959 A3 | 10/1999 |
| EP | 948959 A2 * | 10/1999 |
| EP | 0948959 A2 * | 10/1999 |
| EP | 1 486 547 A2 | 12/2004 |
| EP | 1 486 547 A3 | 12/2004 |
| GB | 1 456 629 A | 11/1976 |
| GB | 2 084 588 A | 4/1982 |
| JP | 60-53578 A | 3/1985 |
| JP | 61-21171 | 1/1986 |
| JP | 05-155901 | 6/1993 |
| JP | 6-299136 A | 10/1994 |
| JP | 2004-035580 | 2/2004 |
| JP | 2004-35580 A | 2/2004 |
| RU | 2172749 | 9/2000 |
| TW | 592722 | 6/2004 |
| WO | WO 97/37842 | 10/1997 |
| WO | WO 01/85441 A1 | 11/2001 |
| WO | WO 02/088468 A2 | 11/2002 |
| WO | WO 03/069061 A1 | 8/2003 |
| WO | WO 03/087473 A1 | 10/2003 |
| WO | WO 03/102065 A1 | 12/2003 |
| WO | WO 2004/029147 | 4/2004 |
| WO | WO 2005/113700 A1 | 12/2005 |
| WO | WO 2007/004978 | 1/2007 |
| WO | WO 2007/004980 | 1/2007 |
| WO | WO 2007/149037 | 12/2007 |

OTHER PUBLICATIONS

Derwent Abstract No. 00095866 abstracting EP 0 229 741 B1.
Imam, S. H. et al., "Wood Adhesive from Crosslinked Poly(vinyl Alcohol) and Partially Gelatinized Starch: Preparation and Properties," Starch/Starke 51, No. 6 (1999) pp. 225-229.
Mori, A. et al., A Honeymoon-Type Adhesive for Wood Products Based on Acetoacetylated Poly(vinyl alcohol) and Diamines: Effect of Diamines and Degree of Acetoacetylation, Journal of Applied Polymer Science, vol. 91 (2004) pp. 2966-2972.
English-language Abstract of Russian document by Ushakov D.N., 2006.
International Search Report and Written Opinion, PCT/SE2007/050405, mailed Sep. 29, 2007.
International Preliminary Report on Patentability, PCT/SE2007/050405, mailed Sep. 30, 2008.
Bastioli, "Starch," *Encyclopedia of Polymer Science and Technology*, 2004.
Matuana et al., "Wood Composites," *Enc. of Poly. Sci. and Tech.*, 2004.
Abstract No. 2003-058843 abstracting WO 02/088468 A2.
Abstract No. 1994-286703 abstracting DE 43 08 089 A1.
Abstract No. 1985-112824 abstracting JP 60-53578 A.
Patent Abstracts of Japan abstracting JP 6-299136.
Machine translation of JP 6-299136.
Patent Abstracts of Japan abstracting JP 2004-35580.
Machine translation of JP 2004-35580.
A.M. Prokhorov, *Great Soviet Encyclopedia*, v. 23, 1976, p. 463-464. (English-language summary of "System" is included as provided by the foreign associate).

* cited by examiner

ADHESIVE SYSTEM AND METHOD

This application claims priority based on U.S. Provisional Patent Application No. 60/695,445, filed Jul. 1, 2005.

The present invention relates to an adhesive system and a method of producing a wood based product.

INTRODUCTION

Formaldehyde based resins such as phenol-formaldehyde resin, melamine-formaldehyde resin and urea-formaldehyde resin are widely used as binders in the production of wood based products. Examples of such wood based products are composite products comprising layers glued together such as plywood, laminated flooring products and veneered products used in, e.g., furniture. Further examples are board products such as particle-, chip- and fibreboards wherein wood chips and/or fibres, together with a binder, are pressed to form a board.

Upon curing a formaldehyde based resin, formaldehyde may be released both during the manufacture of the wood based product and also later during use of the product. Formaldehyde emission to indoor air is a major concern since many years for health reasons.

There is an increasing demand for formaldehyde-free wood adhesives which give sufficient bond strength and overall end-product quality making them suitable as alternatives to prior art adhesives containing formaldehyde based resins.

Water resistance and bond strength are generally important properties reflecting quality for the wood based products. Generally there exist specific quality parameters required for meeting an established standard for a specific end-product. For example, a particle board needs to meet certain standards in terms of, e.g., internal bonding, thickness swelling and water absorption, while a laminated flooring product needs to meet certain standards in terms of, e.g., delamination and fiber tear.

As an alternative to formaldehyde based resins in wood adhesive compositions starch based adhesives have been proposed. Imam et al., "Wood Adhesive from Crosslinked Poly (vinyl alcohol) and Partially Gelatinized Starch: Preparation and Properties", Starch/Stärke 51 (1999) Nr. 6, S. 225-229, discloses an adhesive composition comprising starch and polyvinyl alcohol, the composition further comprising a melamine resin. U.S. Pat. Nos. 2,051,025, 2,102,937, 3,487, 033, 3,355,307 disclose starch based adhesives used for making corrugated paperboard. WO 03/069061 A1 discloses a starch based adhesive used in making a paperboard product. Mori et al., "A honeymoon-type adhesive for wood products . . . ", J. of applied polymer science, Vol. 91, 2966-2972 (2004) discloses acetoacetylated polyvinyl alcohol in wood adhesives. U.S. Pat. Nos. 4,350,788, 4,687,809 and US 2005/ 0197441 A1 disclose the use of acetoacetylated polyvinyl alcohol in wood adhesives.

There is still a need for alternative starch based adhesive systems suitable for gluing wood based materials.

Accordingly, the present invention provides an adhesive system which is based on starch which gives excellent gluing quality. Also, a method of gluing wood based materials is provided and a wood based product.

THE INVENTION

The present invention provides an adhesive system comprising starch and one or more polymers (P) containing acetoacetoxy groups.

By "adhesive system" is herein meant a combination of two or more components which forms, functions as, and is intended to be used as, a wood adhesive. In the term "adhesive" is herein also included the term "binder".

The weight ratio starch to polymers (P) in the adhesive system suitably from about from about 1:2 to about 25:1, preferably from about 1:1 to about 15:1, most preferably from about 3:1 to about 8:1.

In one embodiment the adhesive system comprises an adhesive composition comprising starch and one or more polymers (P) containing acetoacetoxy groups.

The adhesive composition suitably comprises from about 1 to about 50 weight % of starch, preferably from about 10 to about 45 weight %, more preferably from about 20 to about 45 weight %, most preferably from about 30 to about 40 weight %.

The adhesive composition suitably comprises from about 0.1 to about 50 weight % of the one or more polymers (P), preferably 1 to about 40 weight %, more preferably from about 2 to about 25 weight %, most preferably from about 3 to about 15 weight %.

The amount of the sum of starch and the one or more polymers (P) in the adhesive composition is suitably from about 20 to about 70 weight %, preferably from about 35 to about 60 weight %.

The solids content in the adhesive composition is suitably from about 20 to about 70 weight %, preferably from about 35 to about 60 weight %, most preferably from about 40 to about 50 weight %.

By "solids content" of the adhesive composition is herein meant the non-water part of the adhesive composition.

In one embodiment the adhesive system comprises the starch and the one or more polymers (P) as separate components which remain separated until the actual gluing process commences, or is mixed a short time before the gluing process commences. By "short time" is herein suitably meant less than about 1 hour, preferably less than about 30 minutes, most preferably less than about 15 minutes.

The invention further relates to a method of manufacturing an adhesive composition comprising mixing starch and one or more polymers (P) containing acetoacetoxy groups in an aqueous phase. Suitably, starch is added to an aqueous composition comprising the one or more polymers (P). Suitably, the mixing is made at an elevated temperature to at least partly gelatinise the starch. In such a case, the temperature may be elevated in the aqueous composition before starch is added. Alternatively, the temperature may be elevated after starch has been added.

The invention further relates to an adhesive composition obtainable by the method of manufacturing an adhesive composition.

The starch is preferably at least partly gelatinised when present in the adhesive composition or when present as a separate component in a solution or dispersion. The required temperature for at least partly gelatinise the starch depends on the type of starch used, but is generally at least 50° C. The at least partly gelatinised starch is obtainable by subjecting an aqueous mixture comprising starch to an elevated temperature of suitably from about 50 to about 99° C., preferably from about 50 to about 80° C., most preferably from about 55 to about 70° C. The at least partly gelatinised starch is obtainable by maintaining the aqueous mixture comprising starch to the elevated temperature for suitably at least about 0.1 minutes, also suitably from about 0.1 to about 180 minutes, preferably at least 1 minute, also preferably from about 1 to about 100 minutes, most preferably at least 10 minutes, also most preferably from about 10 to about 60 minutes.

In one embodiment, embodiment A, of the invention, the starch is partly gelatinised to a less degree and is obtainable by subjecting an aqueous mixture comprising starch to an elevated temperature of preferably from about 50 to about 70° C., most preferably from about 55 to about 65° C. In this case, the partly gelatinised starch is obtainable by maintaining the aqueous mixture comprising starch to the elevated temperature for preferably at least 1 minute, also preferably from about 1 to about 40 minutes, most preferably at least 5 minutes, also most preferably from about 5 to about 30 minutes.

In another embodiment of the invention, embodiment B, the starch is partly gelatinised to a higher degree, or completely gelatinised, and is obtainable by subjecting an aqueous mixture comprising starch to an elevated temperature of preferably from about 70 to about 99° C., most preferably from about 80 to about 95° C. In this case, the partly gelatinised starch is obtainable by maintaining the aqueous mixture comprising starch to the elevated temperature for preferably at least 1 minute, also preferably from about 1 to about 240 minutes, most preferably at least 10 minutes, also most preferably from about 10 to about 100 minutes.

Examples of suitable starches are native starches and modified starches made from, e.g., potato, corn, wheat, rice, peas etc., such as: acetylated degraded starch, alkyl succinic acid modified starch, oxidated starch, hydroxypropylated starch, cationic starch, amylopectin starch, high amylose acetylated starch, tapioka starch, native potato starch, native corn starch, native wheat starch, native rice starch, and, native pea starch.

The one or more polymers (P) have suitably a weight average molecular weight of from about 1.000 to about 1.000.000 g/mol, preferably from about 10.000 to about 800.000 g/mol, more preferably from about 20.000 to about 600.000 g/mol, most preferably from about 50.000 to about 500.000 g/mol.

The content of acetoacetoxy groups in the one or more polymers (P) is suitably from about 0.05 to about 15 mole %, preferably from about 1 to about 10 mole %.

The one or more polymers (P) preferably comprise acetoacetylated polyvinyl alcohol (AAPVA).

The adhesive system suitably further comprises one or more polymers (P1) containing amine or amide groups. The one or more polymers (P1) preferably comprise primary amine groups or amide groups. Preferably the one or more polymers (P1) comprise one or more of polyvinylamine, polyvinylformamide, a polyethylene imine, a polyamidoamine, poly(vinylalcohol-co-vinylformamide) and poly(vinylalcohol-co-vinylamine. Most preferably the one or more polymers (P1) comprise polyvinylamine or polyethylene imine.

By "amide groups" is herein included formamide groups.

The one or more components of the adhesive system comprising starch, polymer (P) and, optionally, polymer (P1) respectively, or the adhesive composition comprising starch and polymer (P) may further comprise additives such as viscosity adjusting agents and fillers such as kaolin, wheat meal, soy meal, walnut shell meal, or other known to be suitable for use in wood adhesive formulations.

The adhesive composition may also comprise inorganic- or organic salts which may have originated from a solution of the one or more polymers (P) or (P1) used when making the starch based adhesive composition. A part of the one or more polymers (P1) may be ionically charged, preferably cationically charged. The amount of negative counter-ions of the salts in the adhesive composition can be from 0 to about 10 weight %, or from about 0.1 to about 5 weight %, or from about 0.2 to about 1 weight %.

In one embodiment of the method a first applied component comprising the adhesive composition comprising starch and one or more polymers (P) is dried after application and later activated by adding an aqueous composition comprising the one or more polymers (P1).

The starch based adhesive composition may also be combined with a further composition, suitably an adhesive composition, based on a dispersion of a polymer or copolymer of one or more ethylenically unsaturated monomers, which does suitably not comprise any acetoacetoxy groups, and which does suitably also not comprise any amine or amide groups. In this case, the amount of starch based adhesive is suitably from about 10 to about 99 weight %, preferably from about 25 to about 85 weight %, most preferably from about 50 to about 75, based on the total of wet adhesive. This further adhesive composition may, besides being mixed-in with the starch based adhesive, also be used as a separate component in combination with the starch based adhesive composition.

In a further embodiment, the starch based adhesive composition may comprise a polymer or copolymer of one or more ethylenically unsaturated monomers, which does suitably not comprise any acetoacetoxy groups, and which does suitably also not comprise any amine or amide groups.

Examples of suitable polymers or copolymers of one or more ethylenically unsaturated monomers are vinyl ester homopolymers such as polyvinyl acetate, copolymers of vinylesters such as ethylene-vinyl acetate copolymer (EVA) or copolymers of vinylacetate with acrylic monomers such as methylmethacrylate or butylacrylate, styrene-butadiene rubber (SBR), and polyacrylates.

Generally, the inclusion of polymers or copolymers of one or more ethylenically unsaturated monomers, of the types listed above, in the starch based adhesive composition, or in combination with the starch based adhesive composition, may improve the bonding characteristics, such as fiber tear of a veneered or laminated product.

The adhesive system may also be combined with further components, which suitably act as cross-linkers shortly before use. Suitable components are: isocyanates, monomers or polymers containing acetoacetoxy groups, adipic acid, melamine formaldehyde resin, urea formaldehyde resin, melamine salts, aldehydes such as glutaraldehyde, glyoxal, and polymeric aldehydes such as dialdehyde starches, and, complexing agents such a zirconium salts. If used in the adhesive composition, the amount of the cross-linker in the adhesive composition is suitably up to about 30 weight %, or from about 0.1 to about 30 weight %.

The invention further relates to the use of the adhesive system according to the invention for gluing pieces of wood based materials forming a wood based product.

The present invention also relates to a method of producing a wood based product comprising applying the adhesive system, comprising starch and one or more polymers (P) containing acetoacetoxy groups, according to the present invention, onto pieces of a wood-based material and joining the one or more pieces with one or more further pieces of a material, preferably wood based material.

In one embodiment, the method suitably comprises applying the adhesive system as an adhesive composition according to the present invention onto a piece of wood based material, contacting the surface with applied adhesive composition with a surface of another piece of wood based material, thereby joining the pieces through the formation of an adhesive joint between the pieces.

In one embodiment of the method the adhesive composition comprising starch and one or more polymers (P) is dried after application and later activated by adding an aqueous composition.

In one embodiment of the method, the adhesive system is applied onto one or more pieces of a wood-based material as separate components, wherein one component comprises the starch and a further component comprises the one or more polymers (P). The two components are suitably applied in a sequence of time from each other. Alternatively, the two components are suitably applied simultaneously onto the wood based material. The component comprising starch may comprise a starch solution or dispersion, or comprise the starch as a solid material. The component comprising the one or more polymers (P) is suitably a solution or dispersion. As a separate component of the adhesive system, the polymer (P) is suitably present in an aqueous composition comprising from about 1 to about 99 weight % of polymer (P), preferably from about 2 to about 80 weight %, more preferably from about 2 to about 50 weight %, even more preferably from about 3 to about 30 weight %, most preferably from about 5 to about 20 weight %.

In one embodiment, one piece of material may have one component comprising starch of the adhesive system applied while another piece has one component of the adhesive system comprising the one or more polymers (P) applied.

The components of the adhesive system are preferably applied onto the wood based material in a sequence of time from each other, as a first component applied and a second component applied.

In one embodiment, a first applied component, if being a solution or dispersion, is dried after application before the second component is applied.

In one embodiment the first component of the adhesive system applied onto the wood based material is suitably the component comprising starch and the second component applied suitably comprises the one or more polymers (P). The first component applied suitably comprises a starch solution or dispersion and the second component applied suitably comprises a solution or dispersion of the one or more polymers (P).

In one embodiment, the first component applied comprising starch is suitably dried after application and before the second component applied comprising the one or more polymers (P) is applied.

In one embodiment, the first component applied suitably comprises solid starch and the second component applied suitably comprises a solution or dispersion of the one or more polymers (P).

In one embodiment, the first component of the adhesive system applied onto the wood based material is suitably the component comprising the one or more polymers (P) and the second component applied suitably comprises starch. The first component applied suitably comprises a solution or dispersion of the one or more polymers (P) and the second component applied comprises starch, either as a solution or dispersion, or as a solid material.

In one embodiment, the first component comprising the one or more polymers (P) is suitably dried after application and before the second component comprising starch is applied.

The solid starch used in the present invention is suitably a powder and may have various moisture contents.

By wood-based materials is herein, beside solid wood, also included wooden materials such as fibre-, chip-, and particleboard materials. The surfaces to be joined may be of the same or different type of wood based material.

The wood based material can be any type and form of wood based material such as chips, fibres, sheets, laminas, veneers, pieces etc.

In one embodiment, when manufacturing laminated products, the method suitably comprises application of the adhesive composition according to the invention onto a surface so that the glue joint will comprise an originally applied amount of from about 0.1 to about 500 g/m². The applied amount depends on the product to be produced: for compression moulded veneers it is preferably from about 50 to about 200 g/m², for laminated flooring material it is preferably from about 100 to about 160 g/m², and for laminated beams it is preferably from about 180 to about 500 g/m². The suitable upper limit also depends on which type of wood based material that is applied with the solution. The adhesive composition may be applied on one or both of the surfaces to be joined. If applied on both surfaces, the sum of the amounts applied on each surface will correspond to the preferred amounts for the whole glue joint specified.

When making compression-moulded veneers, the method suitably comprises the joining of more than two pieces of wood based materials, preferably from 2 to 15.

In one embodiment, the method comprises gluing pieces of wood based materials wherein the pieces of wood based material are wood chips, in which the term "wood chips" herein includes chips, shavings, flakes, sawdust particles and any similar finely divided wood based material. In this case the wood based product is a composite product such as a chip-, particle- or fibre board, or an oriented strand board.

The moisture content of the wood chips to be used is suitably from about 0 to about 20 weight %, preferably from about 1 to about 10 weight %, more preferably from about 1.5 to about 5 weight %.

The weight ratio wood chips to adhesive system, calculated as dry weight, is suitably from about 100:1 to about 1:1, preferably from about 50:1 to about 2:1, more preferably from about 30:1 to about 2.5:1, most preferably from about 15:1 to about 3:1.

The moisture content of the mixture of wood chips and adhesive system at the beginning of the pressing is suitably from about 3 to about 25 weight %, preferably from about 5 to about 20 weight %, more preferably from about 6 to about 18 weight %, most preferably from about 7 to about 15 weight %.

The application of the adhesive system is preferably followed by pressing. The pressing suitably takes place at an elevated temperature. The pressing temperature depends on which wood based product intended to be manufactured but can suitably be from about 0 to about 250° C. and preferably from about 70 to about 200° C.

For laminated or veneered products, the pressing temperature, when no cross-linker has been added to the adhesive composition, is suitably from about 0° C. to about 200° C., preferably from about 20 to about 150° C., even more preferably from about 50 to about 130° C., most preferably from about 70 to about 130° C. When a cross-linker has been added to the adhesive composition, the pressing temperature may sometimes be decreased depending on the efficiency of the cross-linker.

For particle-, chip-, and fibreboard products, the pressing temperature is preferably from about 100 to about 225° C., most preferably from about 150 to about 200° C. For laminated products, such as plywood, laminated flooring or veneered flooring products, the pressing temperature is preferably from about 70 to about 175° C., most preferably from about 90 to about 160° C.

The pressing time and pressing temperature are linked so that lower pressing temperatures generally require longer pressing times. The wood based product to be produced does also determine suitable pressing temperatures and pressing times. The pressing time is suitably at least about 10 s, also suitably from about 10 s to about 60 minutes, preferably at least about 30 s, also preferably from about 30 s to about 30 minutes, most preferably at least about 1 minute, also preferably from about 1 to about 15 minutes.

In one embodiment, the pieces of wood based material are sheets or lamellas. In this case, the wood based product is suitably a laminated flooring material, veneered flooring, a veneered furniture material, a wall panel, a roofing panel, plywood or a laminated beam.

In one embodiment, when manufacturing laminated products, the method suitably comprises application of the adhesive system according to the invention as separate components of the starch and the polymer (P) onto a surface. Suitably, both the starch and polymer (P) are applied as aqueous compositions. Alternatively, the starch and polymer (P) can be applied onto separate surfaces intended to be joined. The total amount of applied adhesive system onto the one or both surfaces is such that the glue joint suitably comprises an originally applied amount of from about 0.1 to about 500 g/m². The applied amount depends on the product to be produced: for compression moulded veneers it is preferably from about 50 to about 200 g/m², for laminated flooring material it is preferably from about 100 to about 160 g/m². The suitable upper limit also depends on which type of wood based material that is applied with the solution.

In one embodiment, when manufacturing particle-, chip-, or fibre boards, the method suitably comprises application of the adhesive system according to the invention as separate components of the starch and the polymer (P) onto the wood chips. The starch can be applied in solid form or as present in an aqueous composition. Preferably, the starch is applied in solid form. The polymer (P) is suitably applied as an aqueous composition. The polymer (P) is preferably first added to the chips followed by addition of the starch.

The present invention also relates to a wood based product obtainable by the method of producing a wood based product.

The invention further relates to a wood based product comprising pieces of wood based material joined with an adhesive comprising starch and one or more polymers (P) containing acetoacetoxy groups.

The wood based product of the invention is suitably a laminated or veneered material, such as laminated flooring, veneered flooring, a veneered furniture material, plywood, a wall panel, a roofing panel, a laminated beam, or a composite product such as a particle board, fibre board, chip board or oriented strand board. Preferably, it is plywood, a veneered furniture material, veneered flooring, laminated flooring or a particle board.

In one embodiment, the wood based product of the invention comprises one or more layers, joined with one or more adhesive joints comprising starch and one or more polymers (P) containing acetoacetoxy groups.

In one embodiment, the wood based product of the invention comprises a composite product comprising wood based chips joined together with an adhesive comprising starch and one or more polymers (P) containing acetoacetoxy groups. The composite product suitably comprises from about 70 to about 98 weight %, preferably from about 80 to about 90 weight %, of wood based material, from about 2 to about 25 weight %, preferably from about 5 to about 15 weight %, of starch, and from about 0.5 to about 10 weight %, preferably from about 2 to about 6 weight % of the one or more polymers (P), the amounts calculated as dry weight of the composite product.

The composite product is preferably a chip-, particle- or fibre board, or an oriented strand board.

The amount of starch in the one or more dry adhesive joints in the finished wood based product is suitably from about 10 to about 75 weight %, preferably from about 25 to about 65 weight %, most preferably from about 40 to about 60 weight %.

The amount of the one or more polymers (P) in the one or more dry adhesive joints in the finished wood based product is suitably from about 25 to about 90 weight %, preferably from about 35 to about 75 weight %, most preferably from about 40 to about 60 weight %.

The invention is further illustrated by means of the following non-limiting examples. Parts and percentages relate to parts by weight respectively percent by weight, unless otherwise stated.

EXAMPLES

Example 1

A starch based adhesive was made by mixing 66 g of an aqueous solution of about 13 weight % acetoacetylated polyvinylalcohol (AAPVA) (Gohsefimer® Z-220 from Nippon Gohsei), 5 g water and 45 g corn starch (C*Gum NC 03432 from Cerestar, 10% moisture content). The starch was partly gelatinised by stirring the mixture at 63° C. for 20 minutes. The dry content of the adhesive was measured to 43 weight %.

Example 2

Two veneered products were manufactured by gluing a top veneer of 0.6 mm beech onto one side of 15×15 cm particle boards. The boards were applied with 3.7 g of an adhesive composition according to Example 1 and the veneers were directly pressed onto the boards during 1 minute at 90 and 130° C. respectively. The fiber tear (chisel) was tested.

TABLE 1

| Pressing temperature | Fiber tear (%) | |
|---|---|---|
| | Warm | Cold |
| 90° C. | 0 | 10-15 |
| 130° C. | 90-100 | 100 |

Example 3

To 10 parts of the adhesive composition according to Example 1 was added 0.4 parts of an aqueous solution of about 7.5 weight % (22 weight % total dry content including counter ions and salts) polyvinyl amine (Lupamin® 9095 from Basf). Veneered products were manufactured by gluing a top veneer of 0.6 mm beech onto one side of a 15×15 cm particle board. The boards were applied with 3.7 g of the adhesive composition and veneers were directly pressed onto the boards during 1 minute at 90 and 130° C. respectively. The fiber tear (chisel) was tested.

TABLE 2

| Adhesive composition | Pressing temp (° C.) | Fiber tear (%) | |
|---|---|---|---|
| | | Warm | Cold |
| starch + AAPVA + PvAmine | 90 | 5-10 | 80-90 |
| starch + AAPVA + PvAmine | 130 | 100 | 100 |

It is concluded that addition of AAPVA into the adhesive composition increases the bond strength.

Example 4

In further tests, the same adhesive composition as in Example 1 was applied in an amount of 3.34 g onto a particle board and dried. The dried adhesive layer was then remoistened by adding 1.18 g of water followed by veneering a layer of beech onto the boards. The assembly was pressed during 1 minute at 130° C. The fiber tear (%) was tested.

TABLE 3

| Adhesive composition starch + AAPVA (g) | Remoistening, water (g) | Fiber tear (%) Warm | Fiber tear (%) Cold |
| --- | --- | --- | --- |
| 3.34 | 1.18 | 60-70 | 90-100 |

Example 5

A particle board was manufactured by mixing 864 g wood chips, having a moisture content of 2 weight %, with 285 g of an adhesive composition made by mixing 259 g of an aqueous solution of about 17 weight % acetoacetylated polyvinylalcohol (AAPVA) (Gohsefimer® Z-220 from Nippon Gohsei), 3 g water and 138 g corn starch (C*Gum NC 03432 from Cerestar, 10% moisture content). The starch was partly gelatinised by stirring the mixture at 63° C. for 20 minutes. The chips mixture was formed into a sheet of 30×30 cm and pressed at 185° C. for three minutes into a board of 16 mm thickness. The sequence of pressure was 160 kg/cm² during 30 s, 40 kg/cm² during 2.5 min and no pressure during the last 30 s. The tensile strength (internal bond, IB) was measured by gluing pieces of 5×5 cm onto two metal blocks and tearing them apart. Thickness swelling (TSW) and water absorption (ABS) were also measured. Thickness swelling was measured by determining the degree of swelling after a piece of 5×5 cm had been immersed in water (20° C., 24 hrs). Water absorption was measured by determining the weight increase after a piece of 5×5 cm had been immersed in water (20° C., 24 hrs).

The IB value was 180 kPa, TSW 55% and ABS (24 h) was 165%.

The invention claimed is:

1. Adhesive system for gluing pieces of wood based materials comprising at least partly gelatinised starch, a polymer (P) which is an acetoacetylated polyvinylalcohol, and a polymer (P1), being one or more of a polyvinylamine, a polyvinylformamide, a polyethylene imine, a polyamidoamine, a poly(vinylalcohol-co-vinylformamide), and a poly(vinylalcohol-co-vinylamine), the weight ratio of starch to polymer (P) in the adhesive system being from about 1:2 to about 25:1.

2. Adhesive system according to claim 1, comprising the starch and the polymer (P) as separate components.

3. Adhesive system according to claim 1, comprising an adhesive composition comprising the starch and the polymer (P).

4. Adhesive system according to claim 1, wherein the at least partly gelatinised starch is obtained by subjecting an aqueous mixture comprising starch to an elevated temperature of from about 50 to about 99° C.

5. Adhesive system according to claim 3, wherein the amount of starch in the adhesive composition is from about 15 to about 40 weight %.

6. Adhesive system according to claim 3, wherein the amount of polymer (P) in the adhesive composition is from about 2 to about 25 weight %.

7. Combination of an adhesive composition according to claim 3 and a further adhesive composition, based on a dispersion of a polymer of one or more ethylenically unsaturated monomers.

8. Combination according to claim 7, wherein the amount of starch based adhesive is from about 25 to about 85 weight %, based on the total of wet adhesive.

9. Method of manufacturing an adhesive composition comprising mixing starch, a polymer (P) which is an acetoacetylated polyvinylalcohol, and a polymer (P1), being one or more of a polyvinylamine, a polyvinylformamide, a polyethylene imine, a polyamidoamine, a poly(vinylalcohol-co-vinylformamide), and a poly(vinylalcohol-co-vinylamine), in an aqueous phase at an elevated temperature to at least partly gelatinise the starch, and wherein the weight ratio of starch to polymer (P) in the adhesive composition is from about 1:2 to about 25:1.

10. Method according to claim 9, wherein the elevated temperature is from about 50 to about 99° C.

11. Method according to claim 9, wherein the amount of starch in the adhesive composition is from about 15 to about 40 weight %.

12. Method according to claim 9, wherein the amount of one or more polymers (P) In the adhesive composition is from about 2 to about 25 weight %.

13. Adhesive composition obtained by the method according to claim 9.

14. Method of gluing pieces of wood based materials comprising applying an adhesive system comprising at least partly gelatinised starch, a polymer (P) which is an acetoacetylated polyvinylalcohol, and a polymer (P1), being one or more of a polyvinylamine, a polyvinylformamide, a polyethylene imine, a polyamidoamine, a poly(vinylalcohol-co-vinylformamide), and a poly(vinylalcohol-co-vinylamine), the weight ratio starch to polymer (P) in the adhesive system being from about 1:2 to about 25:1, onto one or more pieces of a wood based material, and joining the one or more pieces with one or more further pieces of a material.

15. Method according to claim 14, comprising gluing pieces of wood based materials wherein the pieces of wood based material are sheet-like materials.

16. Method according to claim 14, comprising gluing pieces of wood based materials wherein the pieces of wood based material are wood chips.

17. Wood based product obtained by the method according to claim 14.

18. Wood based product comprising pieces of wood based material joined with an adhesive comprising at least partly gelatinised starch, a polymer (P) which is an acetoacetylated polyvinylalcohol, and a polymer (P1), being one or more of a polyvinylamine, a polyvinylformamide, a polyethylene imine, a polyamidoamine, a poly(vinylalcohol-co-vinylformamide), and a poly(vinylalcohol-co-vinylamine), the weight ratio starch to polymer (P) in the adhesive system being from about 1:2 to about 25:1.

19. Wood based product according to claim 18, comprising one or more layers, joined with one or more adhesive joints comprising starch and the polymer (P).

20. Wood based product according to claim 18, comprising wood based chips joined with an adhesive comprising starch and the polymer (P).

21. Adhesive system according to claim 3, further comprising a polymer of one or more ethylenically unsaturated monomers which do not contain any acetoacetoxy groups.

22. Adhesive system according to claim 21, wherein the polymer of one or more ethylenically unsaturated monomers is a vinyl ester homopolymer or a vinyl ester copolymer.

23. Combination according to claim 7, wherein the polymer of one or more ethylenically unsaturated monomers is a vinyl ester homopolymer or a vinyl ester copolymer.

24. Method according to claim 14, comprising applying the adhesive system as an adhesive composition comprising the starch and the polymer (P).

25. Method according to claim 14, comprising applying the adhesive system as separate components, wherein one component comprises the starch and a further component comprises the polymer (P).

26. Wood based product according to claim 20, having one or more dry adhesive joints comprising starch and the polymer (P), wherein the amount of starch in the one or more dry adhesive joints is from about 25 to about 65 weight %.

27. Wood based product according to claim 20, having one or more dry adhesive joints comprising starch and the polymer (P), wherein the amount of polymer (P) in the one or more dry adhesive joints is from about 35 to about 75 weight %.

28. Wood based product according to claim 20, comprising a composite product comprising wood based chips joined with an adhesive comprising starch and the polymer (P).

29. Wood based product according to claim 28, comprising from about 80 to about 90 weight % of wood based material, from about 5 to about 15 weight % of starch and from about 2 to about 6 weight % of the polymer (P), calculated as dry weight of the composite product.

30. Adhesive system according to claim 1, wherein the polymers (P1) is one or more of polyvinylamine and polyethylene imine.

31. Method according to claim 9, wherein the polymers (P1) is one or more of polyvinylamine and polyethylene imine.

32. Method according to claim 14, wherein the polymers (P1) is one or more of polyvinylamine and polyethylene imine.

33. Wood based product according to claim 18, wherein the polymers (P1) is one or more of polyvinylamine and polyethylene imine.

* * * * *